United States Patent
Jang

(12) 
(10) Patent No.: US 6,208,440 B1
(45) Date of Patent: Mar. 27, 2001

(54) OPTICAL WAVELENGTH FILTER AND OPTICAL DEMULTIPLEXER

(75) Inventor: Joo-nyung Jang, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/986,684

(22) Filed: Dec. 8, 1997

(30) Foreign Application Priority Data

Dec. 6, 1996 (KR) .................................... 96-62477

(51) Int. Cl.$^7$ ........................... H04B 10/00; H04B 10/04
(52) U.S. Cl. ........................... 359/127; 359/130; 385/27
(58) Field of Search .................. 359/127, 130; 385/27

(56) References Cited

U.S. PATENT DOCUMENTS

| | | |
|---|---|---|
| 5,048,909 | 9/1991 | Henry et al. . |
| 5,446,809 | * 8/1995 | Fritz et al. .............................. 385/17 |
| 5,721,796 | * 2/1998 | Barros et al. ........................... 385/37 |
| 5,859,941 | * 1/1999 | Horita .................................... 385/37 |
| 5,875,272 | * 2/1999 | Kewitsch ................................ 385/37 |
| 5,940,556 | * 8/1999 | Moslehi et al. ......................... 385/28 |
| 5,956,167 | * 9/1999 | Iwata et al. ........................... 359/130 |

FOREIGN PATENT DOCUMENTS

| | | |
|---|---|---|
| 0 638 836 A1 | 2/1995 | (EP) . |
| 0 707 224 A1 | 4/1996 | (EP) . |
| WO 96/09703 | 3/1996 | (WO) . |

\* cited by examiner

*Primary Examiner*—Jason Chan
*Assistant Examiner*—Agustin Bello
(74) *Attorney, Agent, or Firm*—Robert E. Bushnell, Esq.

(57) ABSTRACT

An optical demultiplexer for use in a low-power, high-density wavelength division multiplexing (WDM) optical transmission device has a plurality of optical wavelength filters. The optical wavelength filters each include a first input port for receiving a input optical signal, a first output port for outputting only an optical signal having a predetermined wavelength component in the input optical signal, and a second output port for outputting an optical signal having wavelength components other than the predetermined wavelength component. The second output ports of the optical wavelength filters are serially connected to the first output ports of their adjacent optical wavelength filters. Each optical wavelength filter receives an optical signal having a plurality of wavelength components, separates an optical signal having a predetermined wavelength component from the input optical signal, and outputs the optical signal having the predetermined wavelength component via the first output port thereof, and an optical signal having the other wavelength components other than the predetermined wavelength component to the input port of its adjacent optical wavelength filter, which is connected to its second output port, in order to separate an optical signal having another predetermined wavelength component.

38 Claims, 8 Drawing Sheets

LENGTH OF COUPLING REGION

OPTICAL WAVELENGTH FILTER AND OPTICAL DEMULTIPLEXER

CLAIM OF PRIORITY

This application makes reference to, incorporates the same herein, and claims all benefits accruing under 35 U.S.C. §119 from an application for OPTICAL WAVELENGTH FILTER AND OPTICAL DEMULTIPLEXER earlier filed in the Korean Industrial Property Office on Dec. 6, 1996 and there duly assigned Ser. No. 624771996.

BACKGROUND OF THE INVENTION

1. Field of the Invention

The present invention relates to an optical wavelength filter and an optical demultiplexer for a receiver of a wavelength division multiplexing (WDM) transmission system, and more particularly, to an optical demultiplexer for a low-loss, high-density WDM transmission system.

2. Description of the Related Art

A WDM transmission system multiplexes the wavelength area of an optical fiber into several channels by simultaneously transmitting signals of several wavelength bands, relying on the wavelength characteristics of an optical signal. In the WDM transmission system, an input optical signal, having been multiplexed to have several wavelength components, is demultiplexed at the receiver and recognized in the respective channels.

In earlier WDM transmission systems a 1×n coupler and first through nth bandpass filters are connected where n represents the number of channels of a transmitted optical signal.

A coupler is a passive device for branching or coupling optical signals and the output power of each branch optical signal is 1/n that of the input optical signal to the 1×n coupler. Hence, the power output of each of the n optical signals from the n bandpass filters is 1/n that of the input optical signal.

In order to compensate for this loss of power, it is necessary to include an optical amplifier for amplifying the optical signal to increase the power by n times before it is input to the 1×n coupler.

This causes an inconvenience in that the optical demultiplexer for a receiver must have an optical amplifier in order to make for the power loss of the 1×n coupler.

SUMMARY OF THE INVENTION

To solve the above problem, it is an object of the present invention to provide an optical wavelength filter for reflecting only an optical signal of a particular wavelength component with little power loss of the optical signal.

It is another object of the present invention to provide an optical demultiplexer which allows little power loss, for a receiver in an optical wavelength division multiplexing (WDM) transmission system.

Accordingly, to achieve the above first object, there is provided an optical filter comprising first and second couplers and first and second optical wavelength reflectors.

The first coupler has first through fourth ports. The first port receives an input optical signal which has a plurality of wavelength components, divides the output of the optical signal input from the first port and outputs the divided output to third and fourth ports, respectively. The second port combines and outputs the optical signals output from the third and fourth ports, reflected at the first and second optical wavelength reflectors and input back into the first coupler.

The first optical wavelength reflector has an input port and an output port. The input port receives the optical signal from the first coupler via the third port. The output port reflects an optical signal having a predetermined wavelength component among the optical signals received via the input port backward from a light traveling direction, outputs the reflected optical signal to the first coupler via the third port, and outputs an output signal having the other wavelength components.

The second optical wavelength reflector has an input port and an output port. The input port receives the optical signal received from the first coupler via the fourth port. The output port reflects the optical signal having the predetermined wavelength component among the optical signals received from the input port backward from the light traveling direction, outputs the reflected optical signal to the first coupler via the fourth port, and outputs the optical signal having the other wavelength components.

The second coupler has first through fourth ports. The first and second ports receive the optical signals from the first and second optical wavelength reflectors via the outports thereof, respectively. The third port outputs both optical signals received from the first and second ports.

The optical wavelength filter according to the present invention outputs the optical signal received from the second port of the first coupler, having a predetermined wavelength component among the wavelength components of the input optical signal received from the first port of the first coupler, and outputs the optical signal having the other wavelength components except for the predetermined wavelength component among the wavelength components of the input optical signal, to the fourth port of the second coupler.

To achieve the second object, there is provided an optical demultiplexer having a plurality of optical wavelength filters serially connected.

Each optical wavelength filter has a first input port, first and second output ports, first through third couplers and first through fourth optical wavelength reflectors.

The first input port receives an input optical signal which have a plurality of wavelength components. The first output port outputs only an optical signal having a predetermined wavelength component in the input optical signal. The second output port outputs an optical signal having the other wavelength components free of the predetermined wavelength component, and is connected to another first input port corresponding to the second output port. Thus, the optical signal having the other wavelength component except the predetermined wavelength component, output from the second output port, is input to the first input port of another corresponding optical wavelength filter serially connected thereto. Therefore, the optical wavelength filters divide optical signals having different wavelength components and output the same to the respective output ports.

The first coupler has first through fourth ports. The first port connected to the first input port of the corresponding optical wavelength filter receives the input optical signal. The third and fourth ports divide the input optical signal received from the first port into two halves and output the divided outputs, respectively. The second port connected to the first output port outputs optical signals which are reflected from the optical signal output from the third and fourth ports and which are input again to the first coupler.

The first optical wavelength reflector has an input port and an output port. The input port receives the optical signal from the first coupler via the third port thereof. The output port reflects only an optical signal having the predetermined wavelength component in the optical signal received from the input port, outputs the reflected optical signal to the first coupler via the third port thereof, and outputs an optical signal having the other wavelength components free of the predetermined wavelength component.

The second optical wavelength reflector has an input port and an output port. The input port receives the optical signal from the first coupler via the fourth port thereof. The output port for reflecting only an optical signal having the predetermined wavelength component in the optical signal received from the input port, outputs the reflected optical signal to the first coupler via the fourth port thereof, and outputs an optical signal having the other wavelength components free of the predetermined wavelength component.

The second coupler has first through third ports. The first and second ports receive the optical signals from the first and second optical wavelength reflectors via the output ports thereof, respectively. The third port adds both the optical signals received from the first and second ports and outputs the result.

The third coupler has first through fourth port. The first port connected to the second port of the first coupler, receives an optical signal output from the second port of the first coupler. The third and fourth ports divide the optical signal received from the first port into two halves and output the divided outputs respectively. The second port receives back optical signals reflected from the optical signals output via the third and fourth ports. The second port is connected to the first output port of the corresponding optical wavelength filter.

The third optical wavelength reflector has an input port and an output port. The input port receives the optical signal from the third coupler via the third port thereof. The output port reflects only an optical signal having the predetermined wavelength component from the optical signal received via the input port backward from a light traveling direction, outputs the reflected optical signal to the third coupler via the third port thereof, and outputs an optical signal having the other wavelength components.

The fourth wavelength reflector has an input port and an output port. The input port receives the optical signal from the third coupler via the fourth port thereof. The output port reflects only an optical signal having the predetermined wavelength component from the optical signal received via the input port backward from a light traveling direction, outputs the reflected optical signal to the third coupler via the fourth port thereof, and outputs an optical signal having the other wavelength components.

To accomplish the second object of the present invention, there is provided an optical demultiplexer comprising a plurality of optical wavelength filters serially connected to each other, wherein the plurality of optical wavelength optical wavelength filters divided optical signals having each predetermined wavelength component to then output the same to the first output port and output the optical signal having the other wavelength component to the second output port to then be input to the first input port of another corresponding optical wavelength filter. Therefore, the optical demultiplexer according to the present invention can divide the optical signals multiplexed to have various wavelength components into optical signals each having a predetermined wavelength component, without power loss.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
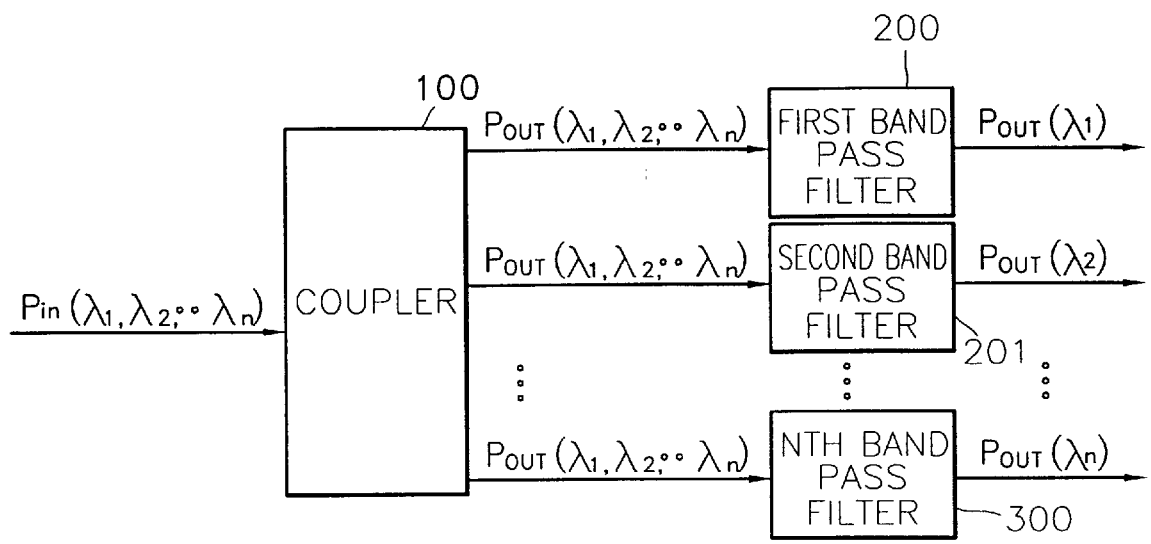
FIG. 1 is a block diagram of an optical demultiplexer for a receiver in a earlier wavelength division multiplexing (WDM) transmission system.

FIG. 1 is a block diagram of an optical demultiplexer for a receiver in an earlier WDM transmission system.

In FIG. 1, the optical demultiplexer for the receiver of the WDM transmission system includes a 1×n coupler 100 and first through nth bandpass filters 200–300. Here, n represents the number of channels of a transmitted optical signal.

A coupler is a passive device for branching or coupling optical signals, that is, for branching an input channel into several output channels or coupling several input channels into an output channel. The 1×n coupler 100 branches an input optical signal, produced by multiplexing optical signals having many wavelength components, for example, $\lambda_1$, $\lambda_2$, ..., $\lambda_n$, into n branch optical signals $P_{out}(\lambda_1, \lambda_2, ..., \lambda_n)$, and outputs them to n respective ports. Here, the power of each branch optical signal $P_{out}(\lambda_1, \lambda_2, ..., \lambda_n)$ is (1/n)th that of the input optical signal of the 1×n coupler 100. The first through nth bandpass filters 200–300 receive the branch optical signals $P_{out}(\lambda_1, \lambda_2, \ldots, \lambda_n)$ from the n ports, pass only their corresponding wavelength components, and output optical signals $P_{out}(\lambda_1), P_{out}(\lambda_2), \ldots, P_{out}(\lambda_n)$ of n channels having wavelength components $\lambda_1$–$\lambda_n$, respectively. Hence, the power of each of the n optical signals $P_{out}(\lambda_1), P_{out}(\lambda_2), \ldots, P_{out}(\lambda_n)$ is (1/n)th that of the input optical signal $P_{in}(\lambda_1, \lambda_2, \ldots, \lambda_n)$.

Figure 2:
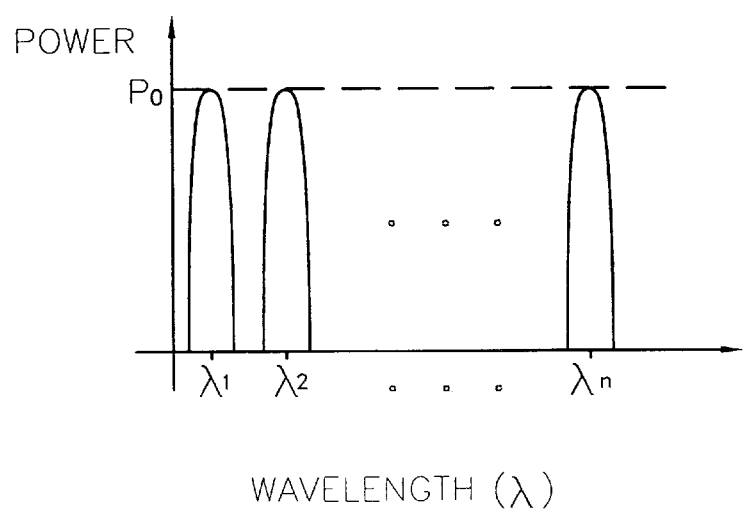
FIG. 2 is a waveform diagram illustrating the power of an optical signals output from the 1×n coupler shown in FIG. 1.

FIG. 2 is a waveform diagram illustrating the power of the input optical signal $P_{in}(\lambda_1, \lambda_2, \ldots, \lambda_n)$ of the 1×n coupler shown in FIG. 1. Here, $\lambda_1$–$\lambda_n$ and $P_0$ represent the wavelength components and the power value of the input optical signal $P_{in}(\lambda_1, \lambda_2, \ldots, \lambda_n)$, respectively.

Figure 3:
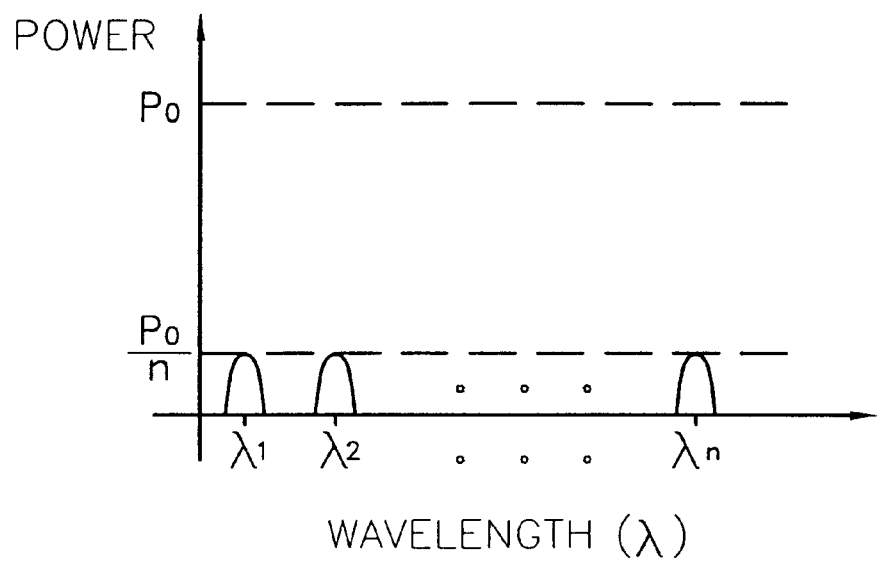
FIG. 3 is a waveform diagram illustrating the power of optical signals output from the 1×n coupler shown in FIG. 1 to first through nth bandpass filters.

FIG. 3 is a waveform digram illustrating the power of the branch optical signal $P_{out}(\lambda_1, \lambda_2, \ldots, \lambda_n)$ output from the 1×n coupler shown in FIG. 1 to each bandpass filter.

In FIG. 3, the branch optical signal $P_{out}(\lambda_1, \lambda_2, \ldots, \lambda_n)$ has (1/n)th the power of the input optical signal $P_{in}(\lambda_1, \lambda_2, \ldots, \lambda_n)$, while keeping the wavelength components of the input optical signal $P_{in}(\lambda_1, \lambda_2, \ldots, \lambda_n)$.

Figure 4A:
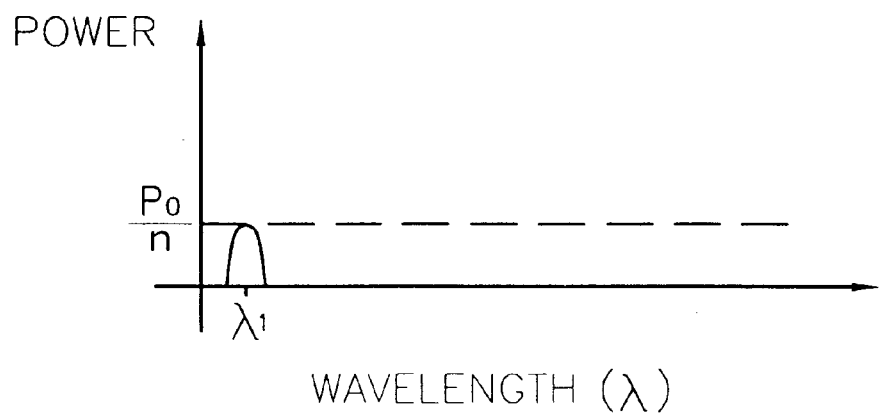
FIG. 4A is a waveform diagram illustrating the power of an optical signal output from the first bandpass filter.
Figure 4B:
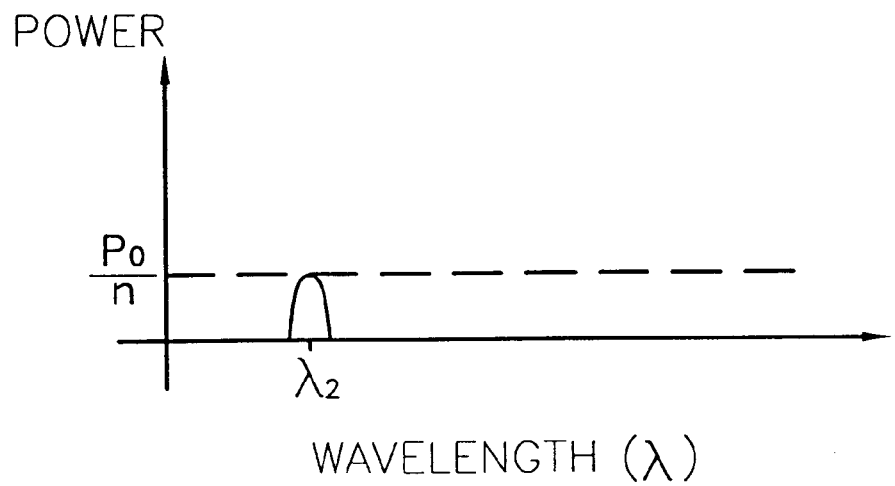
FIG. 4B is a waveform digram illustrating the power of an optical signal output from the second bandpass filter.
Figure 4C:
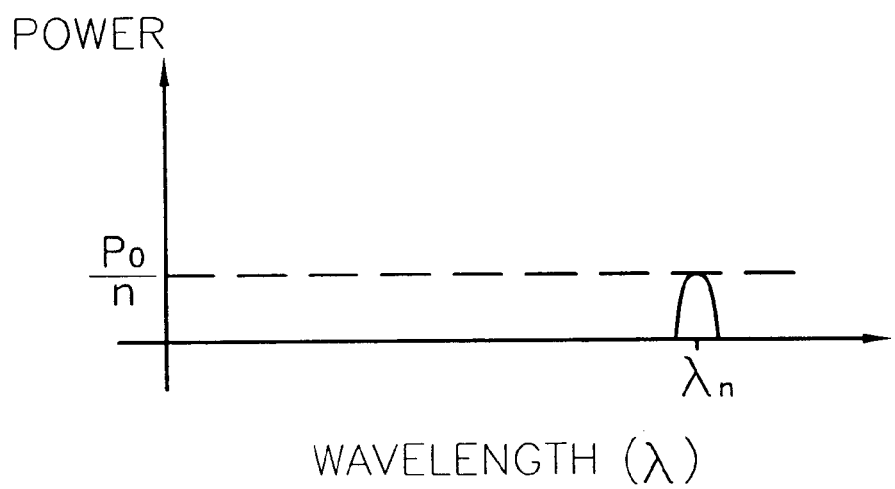
FIG. 4C is a waveform diagram illustrating the power of an optical signal output to the nth bandpass filter.

FIGS. 4A–4C are waveform diagrams illustrating the powers of optical signals $P_{out}(\lambda_1), P_{out}(\lambda_2)$, and $P_{out}(\lambda_n)$ output from the first, second, and nth bandpass filters shown in FIG. 1. Here, the vertical axis of the graphs indicates the powers P of the optical signals, and the horizontal axis indicates the wavelengths λ of the optical signals. $P_0$ denotes the power value of the input optical signal $P_{in}(\lambda_1, \lambda_2, \ldots, \lambda_n)$, and $\lambda_1$–$\lambda_n$ denote the wavelength components multiplexed in the input optical signal $P_{in}(\lambda_1, \lambda_2, \ldots, \lambda_n)$. As shown in FIG. 3, the power of the branch optical signal $P_{out}(\lambda_1, \lambda_2, \ldots, \lambda_n)$ output from the 1×n coupler is (1/n)th that of the input optical signal $P_{in}(\lambda_1, \lambda_2, \ldots, \lambda_n)$, that is, $P_0/n$. Thus, each of the optical signals $P_{out}(\lambda_1), P_{out}(\lambda_2), \ldots, P_{out}(\lambda_n)$ having their respective wavelength components, which are output from the first through nth bandpass filters 200–300, also have (1/n)th the power of the input optical signal $P_{in}(\lambda_1, \lambda_2, \ldots, \lambda_n)$, that is, $P_0/n$.

In the earlier WDM transmission system, use of the 1×n coupler for demultiplexing a multiplexed optical signal at a receiver offers only (1/n)th the power of an input optical signal of the 1×coupler.

In order to make up for the power loss caused by this 1×n coupler, the optical demultiplexer for the receiver in the earlier WDM transmission system further includes an optical amplifier for amplifying an optical signal to increase power by n times before it is input to the 1×coupler.

Figure 5:
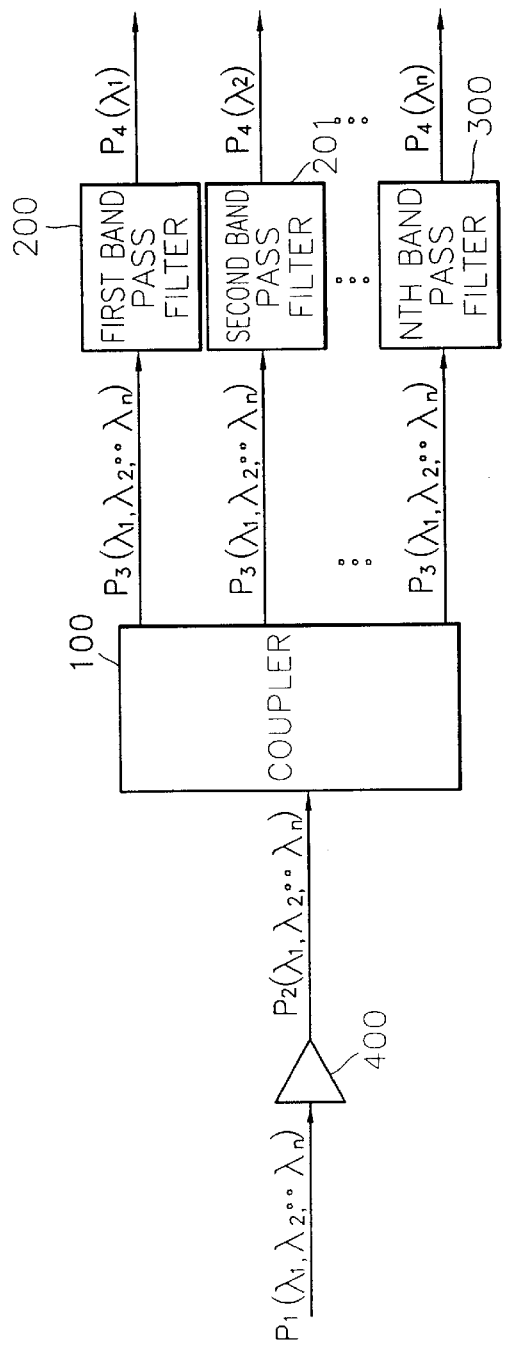
FIG. 5 is a block diagram of an optical demultiplexer for the receiver in the earlier 1 WDM transmission system in order to compensate for power loss caused by the 1×coupler.

FIG. 5 is a block diagram of the optical demultiplexer further including an optical amplifier, for the receiver in the earlier WDM transmission system.

Referring to FIG. 5, the optical demultiplexer has an optical amplifier 400, a 1×n coupler 100, and first through nth bandpass filters 200–300. Here, n denotes the number of channels of a transmitted optical signal.

An optical signal $P_1(\lambda_1, \lambda_2, \ldots, \lambda_n)$ received in the optical amplifier 400 is produced by multiplexing optical signals of many wavelength components, for example, $\lambda_1, \lambda_2, \ldots, \lambda_n$. The optical amplifier 400 amplifies the input optical signal $P_1(\lambda_1, \lambda_2, \ldots, \lambda_n)$ by n times the number of wavelength components included in the input optical signal $P_1(\lambda_1, \lambda_2, \ldots, \lambda_n)$, and outputs an amplified input optical signal $P_2(\lambda_1, \lambda_2, \ldots, \lambda_n)$. The 1×n coupler 100 receives the amplified input optical signal $P_2(\lambda_1, \lambda_2, \ldots, \lambda_n)$, branches the amplified signal, and outputs n branch input optical signals $P_3(\lambda_1, \lambda_2, \ldots, \lambda_n)$. Here, the n branch input optical signals each have (1/n)th the power of the amplified input optical signal $P_2(\lambda_1, \lambda_2, \ldots, \lambda_n)$, that is, a power value as great as or greater than the output of the input optical signal $P_1(\lambda_1,$ $\lambda_2, \ldots, \lambda_n)$, while keeping the wavelength components included in the input optical signal $P_1(\lambda_1, \lambda_2, \ldots, \lambda_n)$. The first through nth bandpass filters 200–300 separate optical signals $P_4(\lambda_1), P_4(\lambda_2), \ldots, P_4(\lambda_n)$ of their corresponding wavelength components from the branch input optical signals $P_3(\lambda_1, \lambda_2, \ldots, \lambda_n)$. Here, the powers of the optical signals $P_4(\lambda_1), P_4(\lambda_2), \ldots, P_4(\lambda_n)$ are each larger than that of the input optical signal $P_1(\lambda_1, \lambda_2, \ldots, \lambda_n)$.

As described above, the earlier WDM transmission system causes an inconvenience in that the optical demultiplexer for a receiver must have an optical amplifier in order to make up for the 1×n coupler-incurred power loss.

Figure 6:
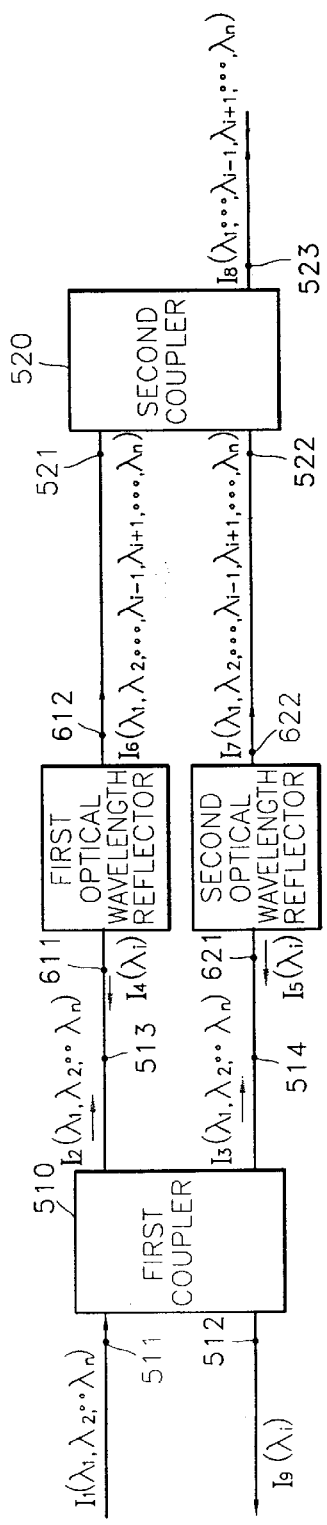
FIG. 6 is a block diagram of an optical wavelength filter according to an embodiment of the present invention.

FIG. 6 is a block diagram of an optical wavelength filter according to an embodiment of the present invention.

Referring to FIG. 6, the optical wavelength filter according to an embodiment of the present invention has first and second optical couplers 510 and 520, and first and second optical wavelength reflectors 610 and 620.

The first and second optical wavelength couplers 510 and 520 are passive devices for branching or coupling optical signals, relying on the optical coupling phenomenon of the optical signal. In general, there are two types of couplers according to methods for branching and coupling optical signals, that is, direct and indirect coupling. In direct coupling, the waveguide modes of waveguide paths were branching and coupling take place are structurally combined with each other, so that optical signals are branched and coupled by a mode field structure in which the electromagnetic fields of the optical signals traveling along waveguide paths are combined. Indirect coupling relies on the fact that every dielectric single mode waveguide path including an optical fiber has a decreasing evanescent electric field even outside a core in terms of indexes. That is, by positioning two single mode waveguide paths adjacent to each other, a waveguide path is excited and optical signals are branched and coupled by the evanescent electric field of adjacent cores. Here, according to theory, two adjacent cores act not as mutually independent waveguide paths but as a combined waveguide path having several waveguide modes, and thus optical coupling takes place due to interference between the modes. In this optical indirect coupling, a coupling coefficient is determined by external factors such as coupling distance, wavelength, and temperature.

The first and second optical couplers 510 and 520 may be constituted by using the characteristic that the coupling coefficient of an indirect coupling-dependent optical coupler varies to a large extent by wavelength and coupling distance.

The first and second optical wavelength reflectors 610 and 620 can reflect optical signals having specific wavelength components backward from optical signal traveling directions by periodically varying the refractive indexes of a fiber sensitive to ultraviolet rays. That is, the reflectors 610 and 620 can reflect only the optical signals of the specific wavelength components backward from their traveling directions under Bragg conditions, by irradiating ultraviolet rays onto a fiber and thus varying its refractive index at very short periods.

Figure 7:
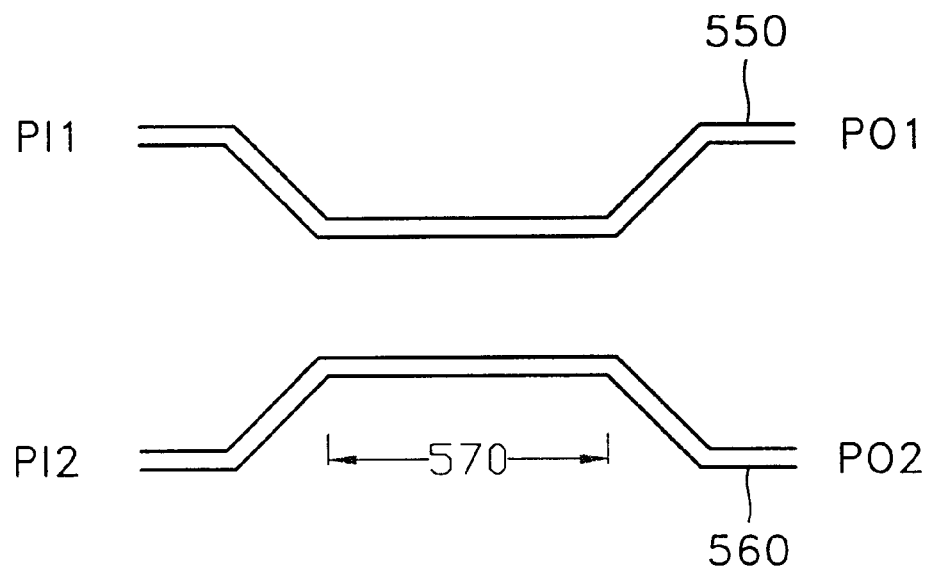
FIG. 7 is a schematic digram illustrating the first and second couplers shown in FIG. 6.

FIG. 7 is a schematic diagram of the first and second optical couplers 510 and 520.

Referring to FIG. 7, the first and second couplers 510 and 520 are bidirectional, and each has two adjacent first and second waveguide paths 550 and 560, first and second waveguide input ports PI1 and PI2, and first and second waveguide output ports PO1 and PO2. Here, reference numeral 570 denotes the length of the optical coupling region being an optical coupling region. No optical coupling takes place when an optical signal travels along the first waveguide path 550 from the first waveguide input port PI1 to the first waveguide output port PO1, whereas an optical coupling takes place when the optical signal is received via the first waveguide input port PI1 and output via the second output port PO2, thus outputting an optical signal having a $-\pi/2$ phase difference from that of the optical signal received via the first waveguide port PI1. The outputs of the optical signal, received from the first waveguide input port PI1, via the first and second waveguide output ports PO1 and PO2 are determined by the length of the optical coupling region, that is, the length of a coupling coefficient. Here, to implement the first and second couplers 510 and 520, the outputs of the first and second wavelength output ports PO1 and PO2 must have predetermined coupling coefficients lengths which are half of the output of the optical signal received via the first waveguide input port PI1.

Figure 8A:
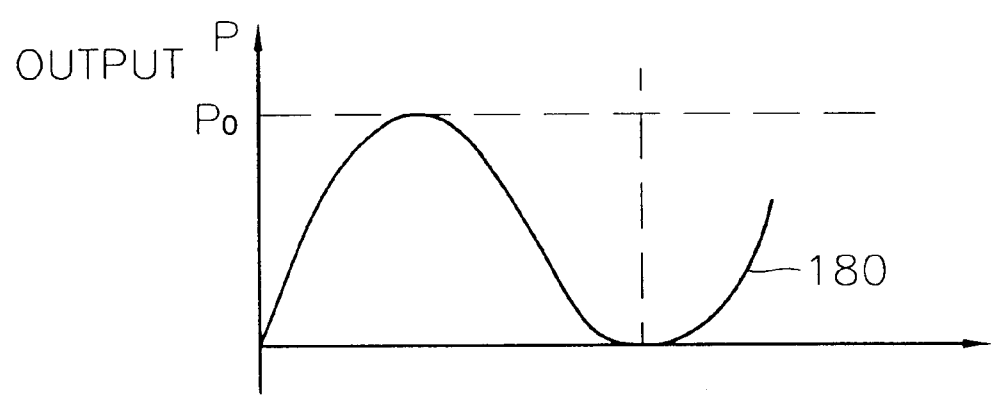
FIG. 8A illustrates an output component of an optical signal received via the input port PI1 of the coupler shown in FIG. 7 and output via the output port PO1 according to the length of an optical coupling region.
Figure 8B:
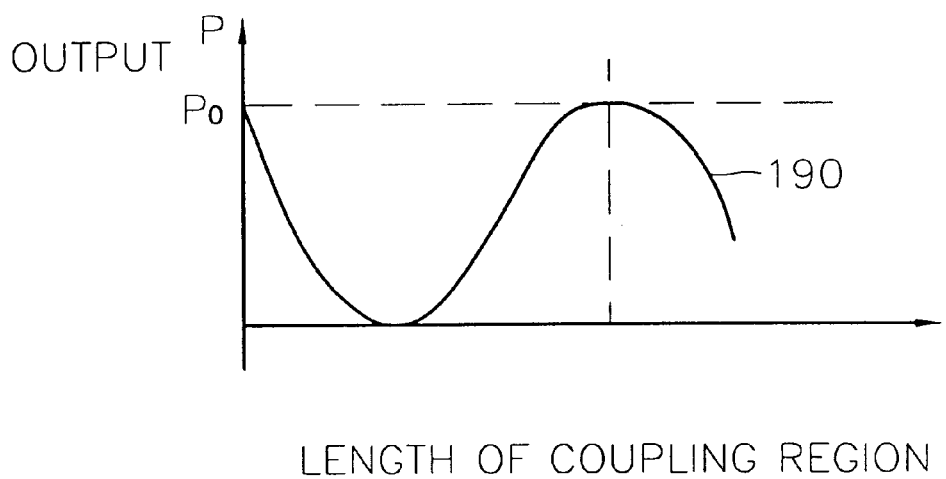
FIG. 8B illustrates an output component of an optical signal received via the input port PI1 of the coupler shown in FIG. 7 and output via the output port PO2 according to the length of a coupling region.
Figure 8C:
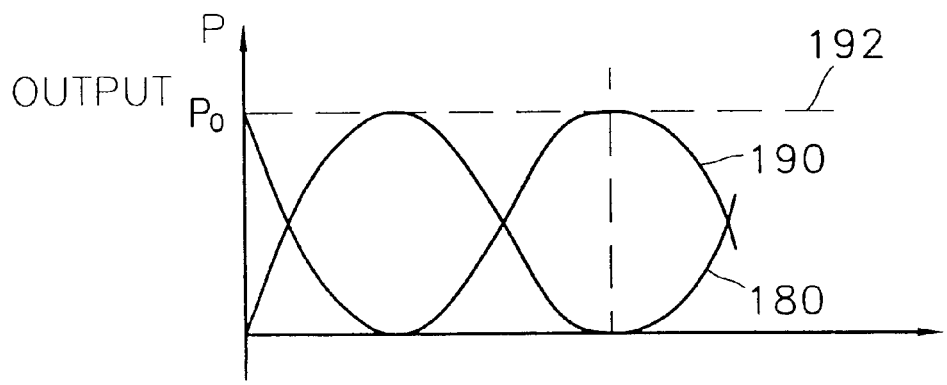
FIG. 8C illustrates the sum of the output components, shown in FIGS. 8A and 8B, of the optical signals output via the output ports PO1 and PO2 according to the length of a coupling region.

FIGS. 8A–8C illustrate the output power of the optical signal, which are received via the first and second waveguide input ports PI1 and PI2 and output via the first and second waveguide output ports PO1 and PO2, in order to describe the operation of the optical couplers shown in FIG. 7.

FIG. 8A is a waveform diagram illustrating the output power of the optical signal, received via the first waveguide input port PI1 and output via the first waveguide output port PO1, according to the length of an optical coupling region.

FIG. 8B is a waveform diagram illustrating the output power of the optical signal, received via the second waveguide input port PI2 and output via the second waveguide output port PO2, according to the length of an optical coupling region.

FIG. 8C illustrate the sum of the output power of the optical signal according to the length of an optical coupling region, which is received via the first input port PI1, branched according to the length of a coupling region, and output via the first and second waveguide output ports PO1 and PO2. Here, the sum of the outputs of the optical signals via the first and second waveguide output ports PO1 and PO2 is equal to that of the optical signal received via the first waveguide input port PI1.

Referring to FIG. 6, the first coupler 510 is provided with first through fourth ports 511–514.

The first port 511 receives an optical signal $I_1(\lambda_1, \lambda_2, \ldots, \lambda_n)$ having wavelength components. The third and fourth ports 513 and 514 divided the output of the optical signal $I_1(\lambda_1, \lambda_2, \ldots, \lambda_n)$ received via the first port 511 into two equal halves, and output optical signals $I_2(\lambda_1, \lambda_2, \ldots, \lambda_n)$ and $I_3(\lambda_1, \lambda_2, \ldots, \lambda_n)$, respectively. That is, the outputs of the optical signals $I_2(\lambda_1, \lambda_2, \ldots, \lambda_n)$ and $I_3(\lambda_1, \lambda_2, \ldots, \lambda_n)$ are each half the output of the optical signal $I_1(\lambda_1, \lambda_2, \ldots, \lambda_n)$. Here, $\lambda_1, \lambda_2, \ldots, \lambda_n$ represent the wavelength components included in each of the optical signals $I_1(\lambda_1, \lambda_2, \ldots, \lambda_n)$, $I_2(\lambda_1, \lambda_2, \ldots, \lambda_n)$, and $I_3(\lambda_1, \lambda_2, \ldots, \lambda_n)$.

The optical signal $I_1(\lambda_1, \lambda_2, \ldots, \lambda_n)$, which is received via the first port 511 and output via the third port 513, experiences no optical coupling while traveling along a waveguide path, thus producing no phase difference between the optical signals $I_2(\lambda_1, \lambda_2, \ldots, \lambda_n)$ and $I_1(\lambda_1, \lambda_2, \ldots, \lambda_n)$. On the other hand, the optical signal $I_1(\lambda_1, \lambda_2, \ldots, \lambda_n)$, which is received via the first port 511 and output to the fourth port 514, experiences an optical coupling in the space between adjacent waveguide paths, thus there is a $-\pi/2$ phase difference between the optical signals $I_3(\lambda_1, \lambda_2, \ldots, \lambda_n)$ and $I_1(\lambda_1, \lambda_2, \ldots, \lambda_n)$.

The third port 513 receives an optical signal $I_4(\lambda_i)$ having a predetermined wavelength component, for example, $\lambda_i$, reflected from the first optical wavelength reflector 610 among the wavelength components of the output optical signal $I_2(\lambda_1, \lambda_2, \ldots, \lambda_n)$. The fourth port 514 receives an optical signal $I_5(\lambda_i)$ having a predetermined wavelength component, for example, $\lambda_i$, reflected from the second optical wavelength reflector 620 among the wavelength components of the output optical signal $I_3(\lambda_1, \lambda_2, \ldots, \lambda_n)$. Here, the phases and outputs of the optical signals $I_4(\lambda_i)$ and $I_5(\lambda_i)$ coming back via the third and fourth ports 513 and 514 are the same as those of the opitcal signals $I_2(\lambda_1, \lambda_2, \ldots, \lambda_n)$ and $I_3(\lambda_1, \lambda_2, \ldots, \lambda_n)$, respectively. Therefore, the optical signal $I_4(\lambda_4)$ has the same phase and half the output of the optical signal $I_1(\lambda_1, \lambda_2, \ldots, \lambda_n)$, whereas the optical signal $I_5(\lambda_i)$ has a $\pi/2$ phase difference from and half the output of the optical signal $I_2(\lambda_1, \lambda_2, \ldots, \lambda_n)$.

the optical signal $I_4(\lambda_i)$, received via the third port 513 of the first coupler 510 and output via the first port 511, does not experience a phase shift since it travels along the waveguide path, while the optical signal $I_5(\lambda_i)$, received via the fourth port 514 of the first coupler 510 and output via the first port 511, has a $-\pi/n$ phase shift since it is subjected to an optical coupling in an optical coupling area between adjacent waveguide paths. Therefore, when the optical signals $I_4(\lambda_i)$ and $I_5(\lambda_i)$ are output via the first port 511 of the first coupler 510, there is a $-\pi$ phase difference between them. As a result, they are counterbalanced and no output is produced.

There is a $-\pi/2$ phase shift when the optical signal $I_4(\lambda_i)$ is received via the third port 513 of the first coupler 510 and output via the second port 512, since it undergoes an optical coupling in the optical coupling area between the adjacent waveguide paths. On the other hand, there is no phase shift when the optical signal $I_5(\lambda_i)$ is input via the fourth port 514 of the first coupler 510 and output via the second port 512, since it travels along the waveguide path. Therefore, there is no phase difference between the optical signals $I_4(\lambda_i)$ and $I_5(\lambda_i)$ when they are output via the second port 512 of the first coupler 510, coupling the optical signals $I_4(\lambda_i)$ and $I_5(\lambda_i)$ into an optical signal $I_9(\lambda_i)$. Hence, the output of the optical signal $I_9(\lambda_i)$ is equal to that of the optical signal $I_1(\lambda_1, \lambda_2, \ldots, \lambda_n)$. The optical signal $I_9(\lambda_i)$ has a predetermined wavelength component, for example, $\lambda_i$, reflected from the first and second optical wavelength reflectors 610 and 620.

The first optical wavelength reflector 610 has an input port 611 and an output port 612.

The input port 611 receives the optical signal $I_2(\lambda_1, \lambda_2, \ldots, \lambda_n)$ from the third port 513 of the first coupler 510. The output port 612 reflects only an optical signal having a predetermined wavelength component, for example, $\lambda_i$, among the wavelength components of the optical signal $I_2(\lambda_1, \lambda_2, \ldots, \lambda_n)$ received via the input port 611, backward from a light traveling direction, outputs the optical signal $I_4(\lambda_i)$ to the first coupler 510 via the third port 513, and outputs an optical signal having the other wavelength components $I_6(\lambda_1, \lambda_{i-}, \lambda_{i+1}, \ldots, \lambda_n)$ via the output port 612.

The second optical wavelength reflector 620 has an input port 621 and an output port 622.

The input port 621 receives the optical signal $I_3(\lambda_1, \lambda_2, \ldots, \lambda_n)$ from the fourth port 514 of the first coupler 510. The output port 622 reflects only an optical signal having a predetermined wavelength component, for example, $\lambda_i$, among the wavelength components of the optical signal $I_3(\lambda_1, \lambda_2, \ldots, \lambda_n)$ received via the input port 621, backward from a light traveling direction, outputs the optical signal $I_5(\lambda_i)$ to the first coupler 510 via the fourth port 514, and outputs an optical signal having the other wavelength components $I_7(\lambda_1, \ldots, \lambda_{i-1}, \lambda_{i+1}, \ldots, \lambda_n)$ via the output port 622.

The second coupler 520 is provided with first through third ports 521, 522, and 523.

The first and second ports 521 and 522 receive the optical signals $I_6(\lambda_1, \ldots, \lambda_{i-1}, \lambda_{i+1}, \ldots, \lambda_n)$ and $I_7(\lambda_1, \ldots, \lambda_{i-1}, \lambda_{i+1}, \ldots, \lambda_n)$ from the first and second optical wavelength reflects 610 and 620 via the output ports 612 and 622, respectively. The third port 523 adds the outputs of the optical signals $I_6(\lambda_1, \ldots, \lambda_{i-1}, \lambda_{i+1}, \ldots, \lambda_n)$ and $I_7(\lambda_1, \ldots, \lambda_{i-1}, \lambda_{i+1}, \ldots, \lambda_n)$ received via the first and second input ports 521 and 522, respectively, and outputs an optical signal $I_8(\lambda_1, \ldots, \lambda_{i-1}, \lambda_{i+1}, \ldots, \lambda_n)$. The phase and output value of the optical signal $I_6(\lambda_1, \ldots, \lambda_{i-1}, \lambda_{i+1}, \ldots, \lambda_n)$ are equal to those of the optical signal $I_4(\lambda_i)$, while the phase and output value of the optical signal $I_7(\lambda_1, \ldots, \lambda_{i-1}, \lambda_{i+1}, \ldots, \lambda_n)$ are equal to those of the optical signal $I_5(\lambda_i)$. The optical signal $I_6(\lambda_1, \ldots, \lambda_{i-1}, \lambda_{i+1}, \ldots, \lambda_n)$ is subjected to an optical coupling in an optical coupling area between adjacent waveguide paths when it is output via the third port 523 of the second coupler 520, thus having a $-\pi/2$ phase shift. On the other hand, the optical signal $I_7(\lambda_1, \ldots, \lambda_{i-1}, \lambda_{i+1}, \ldots, \lambda_n)$ does not have a phase shift when it is output via the third port 523 of the second coupler 520, since it travels along a waveguide path. Therefore, the outputs of the optical signals $I_6(\lambda_1, \ldots, \lambda_{i-1}, \lambda_{i+1}, \ldots, \lambda_n)$ and $I_7(\lambda_1, \ldots, \lambda_{i-1}, \lambda_{i+1}, \ldots, \lambda_n)$ are coupled, since they have the same phase when they are output via the third port 523 of the second coupler 520. Thus, the optical signal $I_8(\lambda_1, \ldots, \lambda_{i-1}, \lambda_{i+1}, \ldots, \lambda_n)$ output via the third port 523 of the second coupler 520 has the same output value as that of the optical signal $I_1(\lambda_1, \lambda_2, \ldots, \lambda_n)$. In addition, the optical signal $I_8(\lambda_1, \ldots, \lambda_{i-1}, \lambda_{i+1}, \ldots, \lambda_n)$ has the other wavelength components except a predetermined wavelength component, for example, $\lambda_i$, among the wavelength components $\lambda_1, \lambda_2, \ldots, \lambda_n$ of the optical signal $I_1(\lambda_1, \lambda_2, \ldots, \lambda_n)$.

As described above, in the optical wavelength filter according to the embodiment of the present invention, an optical signal having a predetermined wavelength component can be separated without power loss of an input optical signal using an optical coupler and a fiber grating reflection filter. Here, a predetermined wavelength value can be set according to user needs, by controlling the grating period of the fiber grating reflection filter.

Figure 9:
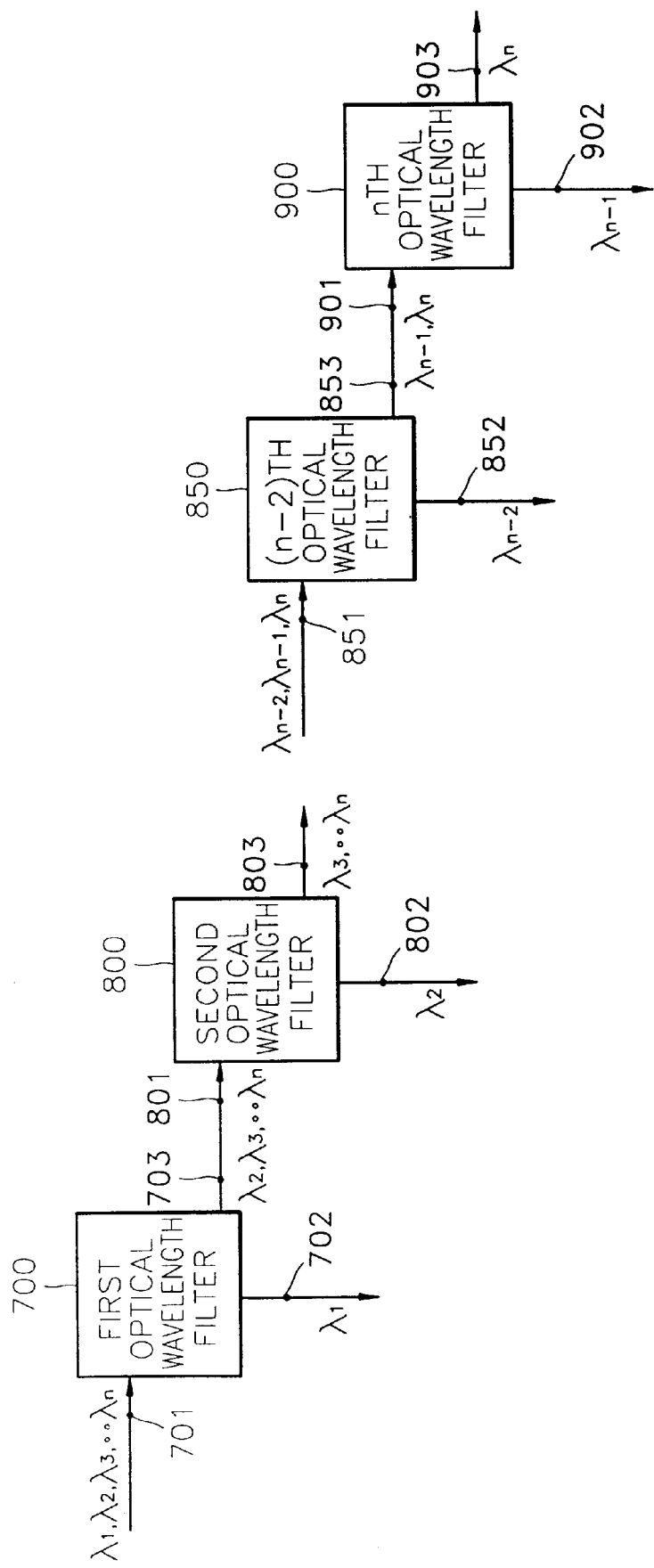
FIG. 9 is a block diagram of an optical demultiplexer according to another embodiment of the present invention.

FIG. 9 is a block diagram of an optical demultiplexer according to another embodiment of the present invention.

Referring to FIG. 9, the optical demultiplexer is provided with first through nth optical wavelength filters 700, 800, . . . , 850 and 900 which are serially connected.

The first through the nth optical wavelength filters 700, 800, . . . , 850, and 900 have first input ports 701, 801, . . . , 851, and 901, first output ports 702, 802, . . . , 852, and 902, and second output ports 703, 803, . . . , 853, and 902.

The first input port 701 of the first optical wavelength filter 700 receives an optical signal $I(\lambda_1, \lambda_2, \ldots, \lambda_n)$ having wavelength components, for example, $\lambda_1, \lambda_2, \lambda_3, \ldots, \lambda_n$. The first output port 702 of the first optical wavelength filter 700 outputs only an optical signal $I(\lambda_1)$ having a wavelength component, for example, $\lambda_1$ among the wavelength components of the optical signal $I(\lambda_1, \lambda_2, \ldots, \lambda_n)$. The second output port 703 of the first wavelength filter 700 outputs an optical signal $I(\lambda_2, \ldots, \lambda_n)$ having other non-$\lambda_1$ wavelength components of the optical signal $I(\lambda_1, \lambda_2, \ldots, \lambda_n)$ to the first input port 801 of the second optical wavelength filter 800. Similarly, an optical signal $I(\lambda_2)$ having a wavelength component, for example, $\lambda_2$ among the wavelength components of the non-$\lambda_1$ optical signal $I(\lambda_2, \ldots, \lambda_n)$ is output via the first output port 802 of the second optical wavelength filter 800, while an optical signal $I(\lambda_3, \ldots, \lambda_n)$ having $\lambda_1$-free and $\lambda_2$-free components $\lambda_3, \ldots, \lambda_n$ is output via the second output port 803 of the second optical wavelength filter 800. Through this procedure, the first input port 901 of the n–1th optical wavelength filter 900 receives an optical signal $I(\lambda_{n-1}, \lambda_n)$ having wavelength components $\lambda_{n-1}$ and $\lambda_n$, the first output port 902 of the (n–1)th optical wavelength filter 900 outputs an optical signal $I(\lambda_{n-1})$ having a wavelength component, for example, $\lambda_{n-1}$, and the second output port 903 of the (n–1)th optical wavelength filter 900 outputs an optical signal $I(\lambda_n)$ having the other wavelength component $\lambda_n$.

Figure 10:
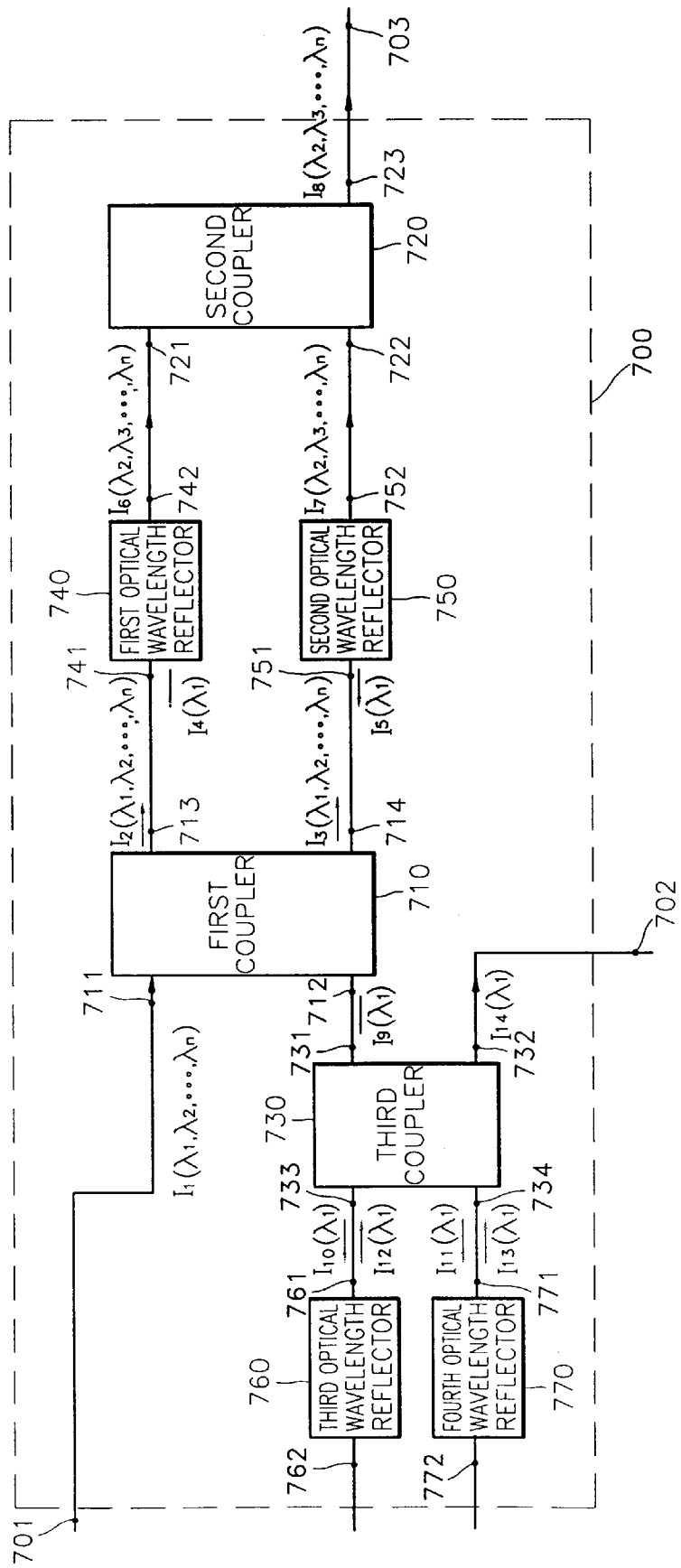
FIG. 10 is a block diagram of a first optical wavelength filter shown in FIG. 9.

FIG. 10 is a block diagram of the first optical wavelength filter 700 shown in FIG. 9.

Referring to FIG. 10, the first optical wavelength filter 700 is provided with the first input port 701, the first and second output ports 702 and 703, first through third couplers 710, 720, and 730, and first through fourth optical wavelength reflectors 740, 750, 760, and 770.

The first input port 701 receives the optical signal $I_1(\lambda_1, \lambda_2, \ldots, \lambda_n)$ having, for example, wavelength components $\lambda_1, \lambda_2, \ldots, \lambda_n$. The first output port 702 outputs an optical signal $I_{14}(\lambda_1)$ having a predetermined wavelength component, for example, $\lambda_1$ among the wavelength components of the optical signal $I_1(\lambda_1, \lambda_2, \ldots, \lambda_n)$. The second output port 703 outputs an optical signal $I_8(\lambda_2, \lambda_3, \ldots, \lambda_n)$ having the other $\lambda_1$-free wavelength components $\lambda_2, \lambda_3, \ldots, \lambda_n$.

The first coupler 710 includes first through fourth ports 711, 712, 713, and 714.

The first port 711 receives the optical signal $I_1(\lambda_1, \lambda_2, \ldots, \lambda_n)$. The third and fourth ports 713 and 714 divide the output of the optical signal $I_1(\lambda_1, \lambda_2, \ldots, \lambda_n)$ received via the first port 711 into two equal halves and output $I_2(\lambda_1, \lambda_2, \ldots, \lambda_n)$ and $I_3(\lambda_1, \lambda_2, \ldots, \lambda_n)$, respectively. Here, $\lambda_1, \lambda_2, \ldots, \lambda_n$ represent the wavelength components of each of the optical signals $I_1(\lambda_1, \lambda_2, \ldots, \lambda_n), I_2(\lambda_1, \lambda_2, \ldots, \lambda_n),$ and $I_3(\lambda_1, \lambda_2, \ldots, \lambda_n)$.

The optical signal $I_1(\lambda_1, \lambda_2, \ldots, \lambda_n)$, received via the first port 711 and output via the third port 713, is not subjected to optical coupling since it travels along a waveguide path, thus a phase difference is not created between the optical signals $I_2(\lambda_1, \lambda_2, \ldots, \lambda_n)$ and $I_1(\lambda_1, \lambda_2, \ldots, \lambda_n)$. The optical signal $I_1(\lambda_1, \lambda_2, \ldots, \lambda_n)$, received from the first port 711 and output via the fourth port 714, is subjected to an optical coupling in the space between adjacent waveguide paths, thus making a $-\pi/2$ phase difference between the optical signals $I_3(\lambda_1, \lambda_2, \ldots, \lambda_n)$ and $I_1(\lambda_1, \lambda_2, \ldots, \lambda_n)$.

The third port 713 receives the optical signal $I_4(\lambda_1)$ having a predetermined wavelength component, for example, $\lambda_1$ reflected back from the first optical wavelength reflector 740. The fourth port 714 receives the optical signal $I_5(\lambda_1)$ having a predetermined wavelength component, for example, $\lambda_1$ reflected backward from the second optical wavelength reflector 750. Here, the optical signals $I_4(\lambda_1)$ and $I_5(\lambda_1)$ reflected back via the third and fourth ports 713 and 714 have the same phases and output values of the optical signals $I_2(\lambda_1, \lambda_2, \ldots, \lambda_n)$ and $I_3(\lambda_1, \lambda_2, \ldots, \lambda_n)$, respectively. Therefore, the optical signal $I_4(\lambda_1)$ have the same phase and half the output of the optical signal $I_1(\lambda_1, \lambda_2, \ldots, \lambda_n)$, whereas the optical signal $I_5(\lambda_1)$ has a $\pi/2$ phase difference from and half the output of the optical signal $I_1(\lambda_1, \lambda_2, \ldots, \lambda_n)$.

The optical signal $I_4(\lambda_1)$, received via the third port 713 of the first coupler 710 and output via the first port 711, does not undergo a phase shift since it travels along the wavelength path, whereas the optical signal $I_5(\lambda_1)$, received via the fourth port 714 of the first coupler 710 and output via the first port 711, has a $-\pi/2$ phase shift again since it is subjected to optical coupling in the optical coupling area between adjacent waveguide paths. Therefore, when the optical signals $I_4(\lambda_1)$ and $I_5(\lambda_1)$ are output via the first port 711 of the first coupler 710, there is a $-\pi$ phase difference between them. As a result, they offset each other, and no output is produced.

The optical signal $I_4(\lambda_1)$, received via the third port 713 of the first coupler 710 and output via the second port 712, has a $-\pi/2$ phase shift since it is subjected to an optical coupling in the optical coupling area between adjacent waveguide paths. On the other hand, the optical signal $I_5(\lambda_1)$, received via the fourth port 714 of the first coupler 710 and output via the second port 712, does not undergo a phase shift since it travels along a waveguide path. Therefore, when the optical signals $I_4(\lambda_1)$ and $I_5(\lambda_1)$ are output via the second port 712 of the first coupler 710, there is no phase difference between them, thus coupling them into an optical signal $I_9(\lambda_1)$. Therefore, the output of the optical signal $I_9(\lambda_1)$ is equal to that of the optical signal $I_9(\lambda_1, \lambda_2, \ldots, \lambda_n)$. The optical signal $I_9(\lambda_1)$ has a predetermined wavelength component, for example, $\lambda_1$ reflected from the first and second optical wavelength reflectors 740 and 750.

The first optical wavelength reflector 740 has an input port 741 and an output port 742.

The input port 741 receives the optical signal $I_2(\lambda_1, \lambda_2, \ldots, \lambda_n)$ from the third port 713 of the first coupler 710. The output port 742 outputs the optical signal $I_4(\lambda_1)$ having a predetermined wavelength component, for example, $\lambda_1$, reflected backward from a light traveling direction among the wavelength components, to the first coupler 710 via the third port 713, and the optical signal $I_6(\lambda_2, \ldots, \lambda_n)$ having the other wavelength components via the output port 742.

The second optical wavelength reflector 750 has an input port 751 and an output port 752.

The input port 751 receives the optical signal $I_3(\lambda_1, \lambda_2, \ldots, \lambda_n)$ from the fourth port 714 of the first coupler 710. The output port 752 outputs the optical signal $I_5(\lambda_1)$ having a predetermined wavelength component, for example, $\lambda_1$, reflected backward from a light traveling direction among the wavelength components, to the first coupler 710 via the fourth port 714, and the optical signal $I_7(\lambda_2, \ldots, \lambda_n)$ having the other wavelength components via the output port 752.

The second coupler 720 is provided with first through third ports 721, 722, and 723.

The first and second ports 721 and 722 receive the optical signals $I_6(\lambda_2, \ldots, \lambda_n)$ and $I_7(\lambda_2, \ldots, \lambda_n)$ from the first and second optical wavelength reflectors 740 and 750 via the output ports 742 and 752, respectively. The third port 723 adds the outputs of the optical signals $I_6(\lambda_2, \ldots, \lambda_n)$ and $I_7(\lambda_2, \ldots, \lambda_n)$ received via the first and second input ports 721 and 722, respectively, and outputs an optical signal $I_8(\lambda_2, \ldots, \lambda_n)$. The phase and output value of the optical signal $I_6(\lambda_2, \ldots, \lambda_n)$ are equal to those of the optical signal $I_4(\lambda_1)$, while the phase and output value of the optical signal $I_7(\lambda_2, \ldots, \lambda_n)$ are equal to those of the optical signal $I_5(\lambda_1)$. The optical signal $I_6(\lambda_2, \ldots, \lambda_n)$ is subjected to optical coupling in an optical coupling region between adjacent waveguide paths when it is output via the third port 723 of the second coupler 720, thus having a $-\pi/2$ phase shift. On the other hand, the optical signal $I_7(\lambda_2, \ldots, \lambda_n)$ does not undergo a phase shift when it is output via the third port 723 of the second coupler 720, since it travels along a waveguide path. Therefore, the outputs of the optical signals $I_6(\lambda_2, \ldots, \lambda_n)$ and $I_7(\lambda_2, \ldots, \lambda_n)$ are coupled, since they have the same phase when they are output via the third port 723 of the second coupler 720. Thus, the optical signal $I_8(\lambda_2, \ldots, \lambda_n)$ output via the third port 723 of the second coupler 720 has the same output value as that of the optical signal $I_1(\lambda_1, \lambda_2, \ldots, \lambda_n)$. In addition, the optical signal $I_8(\lambda_2, \ldots, \lambda_n)$ has the other wavelength components, for example, $\lambda_2, \ldots, \lambda_n$ except a predetermined wavelength component, for example, $\lambda_1$, among the wavelength components of the optical signal $I_1(\lambda_1, \lambda_2, \ldots, \lambda_n)$.

The third coupler 730 is provided with first through fourth ports 731, 732, 733, and 734.

The first port 731 receives an optical signal $I_9(\lambda_1)$ having wavelength components from the second port 712 of the first coupler 710. The third and fourth ports 733 and 734 divide the output of the optical signal $I_9(\lambda_1)$ received via the first port 731 into two equal halves, and output optical signals $I_{10}(\lambda_1)$ and $I_{11}(\lambda_1)$, respectively. That is, the outputs of the optical signals $I_{10}(\lambda_1)$ and $I_{11}(\lambda_1)$ are each half the output of the optical signal $I_9(\lambda_1)$.

The optical signal $I_9(\lambda_1)$, which is received via the first port 731 and output via the third port 513, is not subjected to optical coupling while traveling along a waveguide path, thus making no phase difference between the optical signals $I_{10}(\lambda_1)$ and $I_9(\lambda_1)$. On the other hand, the optical signal $I_9(\lambda_1)$, which is received via the first port 731 and output to the fourth port 734, is subjected to optical coupling in the space between adjacent waveguide paths, thus making a $-\pi/2$ phase difference between the optical signals $I_{11}(\lambda_1)$ and $I_9(\lambda_1)$.

The third port 733 receives an optical signal $I_{12}(\lambda_1)$ having a predetermined wavelength component, for example, $\lambda_1$, reflected from the third optical wavelength reflector 760 among the wavelength components of the output optical signal $I_{10}(\lambda_1)$. The fourth port 734 receives an optical signal $I_{13}(\lambda_1)$ having a predetermined wavelength component, for example, $\lambda_1$, reflected from the fourth optical wavelength reflector 770 among the wavelength components of the output optical signal $I_{11}(\lambda_1)$. Here, the phases and outputs of the optical signals $I_{12}(\lambda_1)$ and $I_{13}(\lambda_1)$ coming back via the third and fourth ports 733 and 734 are the same as those of the topical signals $I_{10}(\lambda_1)$ and $I_{11}(\lambda_1)$, respectively. Therefore, the optical signal $I_{12}(\lambda_1)$ has the same phase and half the output of the topical signal $I_9(\lambda_1)$, whereas the optical signal $I_{13}(\lambda_1)$ has a $\pi/2$ phase difference from and half the output of the optical signal $I_9(\lambda_1)$.

The optical signal $I_{12}(\lambda_1)$, received via the third port 733 of the third coupler 730 and output via the first port 731, is not subjected to a phase shift, since it travels along the waveguide path, while the optical signal $I_{13}(\lambda_1)$, received via the fourth port 734 of the third coupler 730 and output via the first port 731, has a $-\pi/n$ phase shift since it is subjected to optical coupling in an optical coupling area between adjacent waveguide paths. Therefore, when the optical signals $I_{12}(\lambda_1)$ and $I_{13}(\lambda_1)$ are output via the first port 731 of the third coupler 730, there is a $-\pi$ phase difference between them. As a result, they offset each other and no output is produced.

There is a $-\pi/2$ phase shift when the optical signal $I_{12}(\lambda_1)$ is received via the third port 733 of the third coupler 730 and output via the second port 732, since it undergoes an optical coupling in the optical coupling area between the adjacent waveguide paths. On the other hand, there is no phase shift when the optical signal $I_{13}(\lambda_1)$ is input via the fourth port 734 of the third coupler 730 and output via the second port 732, since it travels along the waveguide path. Therefore, there is no phase difference between the optical signals $I_{12}(\lambda_1)$ and $I_{13}(\lambda_1)$ when they are output via the second port 732 of the third coupler 730, coupling the optical signals $I_{12}(\lambda_1)$ and $I_{13}(\lambda_1)$ into an optical signal $I_{14}(\lambda_1)$. Hence, the output of the optical signal $I_{14}(\lambda_1)$ is equal to that of the optical signal $I_9(\lambda_1)$. The optical signal $I_{14}(\lambda_1)$ has a predetermined wavelength component, for example, $\lambda_1$, reflected from the third and fourth optical wavelength reflectors 760 and 770.

The first optical wavelength reflector 760 has an input port 761 and an output port 762.

The input port 761 receives the optical signal $I_{10}(\lambda_1)$ from the third port 733 of the third coupler 730. The output port 762 reflects only an optical signal having a predetermined wavelength component, for example, $\lambda_1$ among the wavelength components of the optical signal $I_{10}(\lambda_1)$ received via the input port 761, backward from a light traveling direction, outputs an optical signal $I_{12}(\lambda_1)$ to the third output 730 via the third port 733, and outputs an optical signal having the other wavelength components via the output port 762.

The fourth optical wavelength reflector 770 has an input port 771 and an output port 772.

The input port 771 receives the optical signal $I_{11}(\lambda_1)$ from the fourth port 734 of the third coupler 730. The output port 772 reflects only an optical signal having a predetermined wavelength component, for example, $\lambda_1$ among the wavelength components of the optical signal $I_{11}(\lambda_1)$ received via the input port 771, backward from a light traveling direction, outputs the optical signal $I_{13}(\lambda_1)$ to the third coupler 730 via the fourth port 734, and outputs an optical signal having the other wavelength components via the output port 772.

Here, the third coupler 730 and the third and fourth optical wavelength reflectors 760 and 770 serve to re-remove optical signals having possible remaining wavelength components other than a predetermined wavelength component, for example, $\lambda_1$, from the optical signal $I_9(\lambda_1)$ output to the first coupler 710 via the second port 712.

In the present invention, by constituting an optical demultiplexer of optical wavelength filters including optical couples and optical wavelength reflectors, there is little power loss of an optical signal caused by 1×n coupling in an optical demultiplexer for a receiver of an earlier WDM transmission system, thereby obviating the need for an optical amplifier used in the earlier optical demultiplexer in order to make up for the power loss of the optical signal. In addition, since there are no limits to the number of channels that can be divided, the optical demultiplexer of the present invention can be useful to a high-density WDM transmission system for increasing transmission capacity.

While the present invention has been illustrated and described with reference to specific embodiments, further modifications and alterations will occur to those skilled in the art within the spirit and scope of this invention.

What is claimed is:

1. An optical filter comprising:

a first coupler having a first port for receiving an input optical signal having a plurality of wavelength components, third and fourth ports for dividing the input optical signal received via the first port and outputting the divided outputs, respectively, and a second port for outputting optical signals which are reflected back from optical signals output from the third and fourth ports;

a first optical wavelength reflector having an input port for receiving an optical signal from the third port of the first coupler, and an output port for reflecting an optical signal having a predetermined wavelength component from optical signals received via the input port backward from a light traveling direction, outputting the reflected optical signal to the third port of the first coupler, and outputting an output signal having wavelength components other than the predetermined wavelength component;

a second optical wavelength reflector having an input port for receiving an optical signal from the fourth port of the first coupler, an output port for reflecting the optical signal having the predetermined wavelength component from optical signals received from the input port backward from the light traveling direction, outputting the reflected optical signal to the fourth port of the first coupler, and outputting the optical signal having wavelength components other than the predetermined wavelength component; and a second coupler having first and second ports for receiving optical signals from the respective output ports of the first and second optical wavelength reflectors, there being a $-\pi/2$ phase difference between the optical signals received by the first and second ports, and a third port for outputting the optical signals received by the first and second ports thereof, said third port having an optical coupling area for causing a $-\pi/2$ phase shift to one of said optical signals received by the first and second ports of the second coupler such that said optical signals output from said third port have the same phase and are thus coupled when output from the third port of the second coupler, the optical signal received from the second port of the first coupler being predetermined wavelength component of the input optical signal received from the first port of the first coupler and the output of the input optical signal, and the optical signal received from the second coupler via the third port thereof having wavelength components except for the predetermined wavelength component of the input optical signal.

2. The optical waveguide filter as claimed in claim 1, the first coupler dividing the input optical signal into two equal halves and outputting the divided outputs via the third and fourth ports, respectively.

3. The optical waveguide filter as claimed in claim 1, there being no phase difference between the optical signal received by the first port of the first coupler and the optical signal output by the third port of the first coupler.

4. The optical waveguide filter as claimed in claim 1, there being a $-\pi/2$ phase difference between the optical signal received by the first port of the first coupler and the optical signal output by the fourth port of the first coupler.

5. The optical waveguide filter as claimed in claim 1, there being a $-\pi/2$ phase difference between the optical signal received by the first port of the second coupler and the optical signal output by the third port of the second coupler.

6. The optical waveguide filter as claimed in claim 1, there being no phase difference between the optical signal received by the second port of the second coupler and the optical signal output by the third port of the second coupler.

7. The optical waveguide filter as claimed in claim 1, the first optical wavelength reflector comprising a fiber grating filter for reflecting only an optical signal having a predetermined wavelength component backward from an optical signal traveling direction by varying a refractive index of a fiber sensitive to ultraviolet rays in regular grating periods having regular intervals.

8. The optical waveguide filter as claimed in claim 7, there being no phase difference between the optical signal reflected from the input port of the first optical wavelength reflector and the input optical signal.

9. The optical waveguide filter as claimed in claim 1, the second optical wavelength reflector comprising a fiber grating filter for reflecting only an optical signal having a predetermined wavelength component backward from an optical signal traveling direction by varying a refractive index of a fiber sensitive to ultraviolet rays in regular grating periods having regular intervals.

10. The optical waveguide filter as claimed in claim 9, there being no phase difference between the optical signal reflected from the input port of the second optical wavelength reflector and the input optical signal.

11. The optical waveguide filter as claimed in claim 9, the predetermined wavelength being set for user demands by controlling grating periods under Bragg conditions.

12. The optical waveguide filter as claimed in claim 1, the optical signals having the predetermined wavelength components, received back by the third and fourth ports of the first coupler and having a $-\pi/2$ phase difference, and being coupled by compensation interference since they have the same phase when output from the second port of the first coupler.

13. The optical waveguide filter as claimed in claim 1, the optical signals having the predetermined wavelength components, received back by the third and fourth ports of the first coupler and having a $-\pi/2$ phase difference, and being counterbalanced so as to produce no output since they have a $-\pi$ phase difference when output from the first port of the first coupler.

14. The optical wavelength filter as claimed in claim 1, further comprising:
  a third coupler having a first port connected to the second port of the first coupler, for receiving an optical signal, third and fourth ports for dividing the optical signal received from the first port into two halves and outputting the divided outputs respectively, and a second port for receiving back optical signals reflected from the optical signals output via the third and fourth ports;
  a third optical wavelength reflector having an input port for receiving the optical signal from the third port of the third coupler, and an output for reflecting only an optical signal having the predetermined wavelength component from the optical signal received via the input port backward from a light traveling direction, outputting the reflected optical signal to the third port of the third coupler, and outputting an optical signal having wavelength components other than the predetermined wavelength component; and
  a fourth wavelength reflector having an input port for receiving the optical signal from the fourth port of the third coupler, and an output port for reflecting only an optical signal having the predetermined wavelength component from the optical signal received via the input port backward from a light traveling direction, outputting the reflected optical signal to the fourth port of the third coupler, and outputting an optical signal having wavelength components other than the predetermined wavelength component,
  so that wavelength components other than the predetermined wavelength component are again removed from the optical signal output from the second port of the first coupler.

15. An optical demultiplexer having a first input port for receiving an input optical signal having a plurality of wavelength components, a first output port for outputting an optical signal having only a predetermined wavelength component from the input optical signal, a second output port for outputting an optical signal having wavelength components other than that of the predetermined wavelength component, and a plurality of optical wavelength filters serially connected and connected to another first input port corresponding to the second output port,
  the plurality of optical wavelength filters each comprising:
    a first coupler having a first port connected to the first input port, for receiving the input optical signal, third and fourth ports for dividing the input optical signal received from the first port into two halves and outputting the divided outputs, respectively, and a second port connected to the first output port, for outputting optical signals reflected from the optical signal output from the third and fourth ports;
    a first optical wavelength reflector having an input port for receiving the optical signal from the third port of the first coupler, and an output port for reflecting only an optical signal having the predetermined wavelength component from the optical signal received from the input port, outputting the reflected optical signal to the third port of the first coupler, and outputting an optical signal having the wavelength components other than that of the predetermined wavelength component;
    a second optical wavelength reflector having an input port for receiving the optical signal from the fourth port of the first coupler, and an output port for reflecting only an optical signal having the predetermined wavelength component of the optical signal received from the input port, outputting the reflected optical signal to the fourth port of the first coupler, and outputting an optical signal having wavelength components other than that of the predetermined wavelength component; and
    a second coupler having first and second ports for receiving the optical signals from the respective output ports of the first and second optical wavelength reflectors, and a third port connected to the second output port of the optical wavelength filter, for outputting the optical signals received from both the first and second ports, there being a $-\pi/2$ phase difference between the optical signals received by the first and second ports of the second coupler, said third port having an optical coupling area for causing a $-\pi/2$ phase shift to one of said optical signal such that said optical signals output from said third port have the same phase and are thus coupled;
  the optical signals received from the first output ports of the plurality of optical wavelength filters having predetermined wavelength components different from one another.

16. The optical demultiplexer as claimed in claim 15, the first coupler dividing the output of the input optical signal into two equal halves, and outputting the divided outputs via the third and fourth ports thereof.

17. The optical demultiplexer as claimed in claim 15, there being no phase difference between the optical signal received by the first port of the first coupler and the optical signal output by the third port of the first coupler.

18. The optical demultiplexer as claimed in claim 15, there being a $-\pi/2$ phase difference between the optical signal received by the first port of the first coupler and the optical signal output by the fourth port of the first coupler.

19. The optical demultiplexer as claimed in claim 15, there being a $-\pi/2$ phase difference between the optical signal received by the first pot of the second coupler and the optical signal output the third port of the first coupler.

20. The optical demultiplexer as claimed in claim 15, there being no phase difference between the optical signal received by the second port of the second coupler and the optical signal output via the third port of the second coupler.

21. The optical demultiplexer as claimed in claim 15, the optical signals having the predetermined wavelength components, received back by the third and fourth ports of the first coupler, and having a $-\pi/2$ phase difference, and coupled by compensation interference since they have the same phase when output from the second port of the first coupler.

22. The optical demultiplexer as claimed in claim 15, the optical signals having the predetermined wavelength components, received back by the third and fourth ports of the first coupler, and having a −π/2 phase difference, and being counterbalanced so as to produce no output since they have a −π phase difference when output from the first port of the first coupler.

23. The optical demultiplexer as claimed in claim 15, the first optical wavelength reflector comprising a fiber grating filter for reflecting only an optical signal having a predetermined wavelength component backward from an optical signal traveling direction by varying a refractive index of a fiber sensitive to ultraviolet rays in regular grating periods having regular intervals.

24. The optical demultiplexer as claimed in claim 22, there being no phase difference between the optical signal reflected from the input port of the first optical wavelength reflector and the input optical signal received via the input port.

25. The optical demultiplexer as claimed in claim 15, the second optical wavelength reflector comprising a fiber grating filter for reflecting only an optical signal having a predetermined wavelength component backward from an optical signal traveling direction by varying a refractive index of a fiber sensitive to ultraviolet rays in regular grating periods having regular intervals.

26. The optical demultiplexer as claimed in claim 24, there being no phase difference between the optical signal reflected from the input port of the second optical wavelength reflector and the input optical signal received via the input port.

27. The optical demultiplexer as claimed in claim 15, the plurality of wavelength filters each comprising:
a third coupler having a first port connected to the second port of the first coupler, for receiving an optical signal, third and fourth ports for dividing the optical signal received from the first port into two halves and outputting the divided outputs respectively, and a second port for receiving back optical signals reflected from the optical signals output via the third and fourth ports;
a third optical wavelength reflector having an input port for receiving the optical signal from the third port of the third coupler, and an output port for reflecting only an optical signal having the predetermined wavelength component from the optical signal received via the input port backward from a light traveling direction, outputting the reflected optical signal to the third port of the third coupler, and outputting an optical signal having the wavelength components other than the predetermined wavelength component; and
a fourth wavelength reflector having an input port for receiving the optical signal from the fourth port of the third coupler, and an output port for reflecting only an optical signal having the predetermined wavelength component from the optical signal received via the input port backward from a light traveling direction, outputting the reflected optical signal to the fourth pot of the third coupler, and outputting an optical signal having wavelength components other than the predetermined wavelength component,
so that wavelength components other than the predetermined wavelength component are again removed from the optical signal output from the second port of the first coupler.

28. The optical demultiplexer as claimed in claim 26, the third optical wavelength reflector comprising a fiber grating filter for reflecting only an optical signal having a predetermined wavelength component backward from an optical signal traveling direction by varying a refractive index of a fiber sensitive to ultraviolet rays in regular grating periods having regular intervals.

29. The optical demultiplexer as claimed in claim 27, there being no phase difference between the optical signal reflected from the input port of the third optical wavelength reflector and the input optical signal.

30. The optical demultiplexer as claimed in claim 26, the fourth optical wavelength reflector comprising a fiber grating filter for reflecting only an optical signal having a predetermined wavelength component backward from an optical signal traveling direction by varying a refractive index of a fiber sensitive to ultraviolet rays in regular grating periods having regular intervals.

31. The optical demultiplexer as claimed in claim 29, there being no phase difference between the optical signal reflected from the input port of the fourth optical wavelength reflector and the input optical signal.

32. The optical demultiplexer as claimed in claim 29, grating periods of the first through fourth wavelength reflectors being the same and the predetermined wavelengths being set for user demands by controlling the grating periods under Bragg conditions.

33. The optical demultiplexer as claimed in claim 26, the third coupler dividing the output of the input optical signal into two equal halves, and outputting the divided outputs via the third and fourth ports thereof.

34. The optical demultiplexer as claimed in claim 26, there being no phase difference between the optical signal received by the first port of the third coupler and the optical signal output the third port of the third coupler.

35. The optical demultiplexer as claimed in claim 26, there being a −π/2 phase difference between the optical signal received by the first port of the third coupler and the optical signal received by the first port of the third coupler and output via the fourth port thereof.

36. The optical demultiplexer as claimed in claim 26, the optical signals having the predetermined wavelength components, received back by the third and fourth ports of the third coupler, and having a −π/2 phase difference, and coupled by compensation interference since they have the same phase when output from the second port of the third coupler.

37. The optical demultiplexer as claimed in claim 26, the optical signals having the predetermined wavelength components, received back by the third and fourth ports of the third coupler, and having a −π/2 phase difference, and being counterbalanced so as to produce no output since they have a −π phase difference when output from the first port of the third coupler.

38. The optical demultiplexer as claimed in claim 15, a number of optical wavelength filters equal to the number of wavelength components minus one being serially connected in order to demultiplex the optical signals having the respective wavelength components which are multiplexed by a wavelength division multiplexing method.

* * * * *